United States Patent
Baldemair et al.

(10) Patent No.: US 11,672,023 B2
(45) Date of Patent: *Jun. 6, 2023

(54) METHODS AND DEVICES FOR COMMUNICATING ON A RADIO CHANNEL BASED ON JOINTLY ENCODING A PREAMBLE FORMAT WITH RANDOM ACCESS CONFIGURATION

(71) Applicant: Optis Wireless Technology, LLC, Plano, TX (US)

(72) Inventors: Robert Baldemair, Solna (SE); David Astely, Bromma (SE)

(73) Assignee: OPTIS WIRELESS TECHNOLOGY, LLC, Plano, TX (US)

( * ) Notice: Subject to any disclaimer, the term of this patent is extended or adjusted under 35 U.S.C. 154(b) by 104 days.

This patent is subject to a terminal disclaimer.

(21) Appl. No.: 17/518,263

(22) Filed: Nov. 3, 2021

(65) Prior Publication Data

US 2022/0061102 A1 Feb. 24, 2022

Related U.S. Application Data

(63) Continuation of application No. 16/359,123, filed on Mar. 20, 2019, now Pat. No. 11,197,325, which is a continuation of application No. 15/728,637, filed on Oct. 10, 2017, now Pat. No. 10,285,205, which is a continuation of application No. 13/766,111, filed on Feb. 13, 2013, now Pat. No. 9,814,072, which is a
(Continued)

(51) Int. Cl.
*H04W 74/08* (2009.01)
*H04W 74/00* (2009.01)

(52) U.S. Cl.
CPC ..... *H04W 74/0833* (2013.01); *H04W 74/004* (2013.01)

(58) Field of Classification Search
CPC .................. H04W 74/0833; H04W 74/004
See application file for complete search history.

(56) References Cited

U.S. PATENT DOCUMENTS 8,553,590 B2   10/2013 Baldemair et al.
9,814,072 B2   11/2017 Baldemair et al.
(Continued)

FOREIGN PATENT DOCUMENTS

EP      2 034 755 A1    3/2009
WO   2005/109730 A1   11/2005
(Continued)

OTHER PUBLICATIONS

3rd Generation Partnership Project, "Sequence ordering and other RACH issues," TSG-RAN WG1 #50bils, R1-074340, Shanghai, China, Oct. 8-12, 2007.
(Continued)

*Primary Examiner* — Faruk Hamza
*Assistant Examiner* — Alan L Lindenbaum
(74) *Attorney, Agent, or Firm* — Nixon & Vanderhye P.C.

(57) ABSTRACT

Devices and methods for transmitting data on a radio channel comprise jointly encoding a preamble format with a first random access configuration, thereby forming an extended random access configuration represented by a set of bits. The first random access configuration comprises a combination of a density value and a version index. Each preamble format is associated with a plurality of version indexes.

20 Claims, 10 Drawing Sheets

Related U.S. Application Data continuation of application No. 12/747,593, filed as application No. PCT/SE2008/050934 on Aug. 20, 2008, now Pat. No. 8,553,590.

(60) Provisional application No. 61/013,051, filed on Dec. 12, 2007.

(56) References Cited

U.S. PATENT DOCUMENTS

| | | | |
|---|---|---|---|
| 10,285,205 | B2 | 5/2019 | Baldemair et al. |
| 2008/0026716 | A1 | 10/2008 | Bertrand |
| 2008/0267161 | A1 | 10/2008 | Bertrand |
| 2009/0046629 | A1 | 2/2009 | Jiang |
| 2010/0265854 | A1 | 10/2010 | Baldemair et al. |
| 2013/0188534 | A1 | 7/2013 | Baldemair et al. |
| 2018/0049248 | A1 | 2/2018 | Baldemair et al. |
| 2019/0215876 | A1 | 7/2019 | Baldemair et al. |

FOREIGN PATENT DOCUMENTS

| | | |
|---|---|---|
| WO | 2006/138556 A2 | 12/2006 |
| WO | 2007/139188 A1 | 12/2007 |
| WO | 2007/145555 A1 | 12/2007 |
| WO | 2009/022836 A2 | 2/2009 |

OTHER PUBLICATIONS

3rd Generation Partnershp Project. "Proposal for RACH Preambles." TSG-RAN Working Group 1 meeting #6, 2GPP/TSGR1#6(99)893, Espoo, Finland, Jul. 13-16, 1999.
3rd Generation Partnership Project. "3GPP FDD, spreading and modulation specification." TSG-RAN Working Group 1 meeting #2, TSGR1#2(99)051, Yokohama, Japan, Feb. 22-25, 1999.
3rd Generation Partnership Project. "Joint Signaling of PRACH Configuration and Preamble for TDD." TSG-RAN WG1 #51bis, R1-080351, Sevilla, Spain, Jan. 14-18, 2008.
3rd Generation Partnership Project. "Random Access Slot Configurations." 3GPP TSG RAN WG1 #50bis, R1-074144, Shanghai, China, Oct. 8-12, 2007.
3rd Generation Partnership Project. "On Remaining PRACH Issues for TDD." TSG-RAN WG1 #52, R1-080896, Sorrento, Italy, Feb. 11-15, 2008.
Office Action dated Aug. 9, 2017 in corresponding Canadian App No. 2,821,063. (4 pages).
Office Action dated Mar. 28, 2018 in U.S. Appl. No. 15/728,637.
Final Office Action dated Aug. 27, 2018 in U.S. Appl. No. 15/728,637.
Notice of Allowance dated Dec. 21, 2018 in U.S. Appl. No. 15/728,637.
Office Action dated Oct. 24, 2013 in U.S. Appl. No. 13/766,111.
Final Office Action dated May 22, 2014 in U.S. Appl. No. 13/766,111.
Examiner's Answer dated Jan. 15, 2015 in U.S. Appl. No. 13/766,111.
Notice of Allowance dated Mar. 7, 2017 in U.S. Appl. No. 13/766,111.
Notice of Allowance dated Jul. 7, 2017 in U.S. Appl. No. 13/766,111.
Office Action dated Jun. 26, 2012 in U.S. Appl. No. 12/747,593.
Final Office Action dated Nov. 6, 2012 in U.S. Appl. No. 12/747,593.
Notice of Allowance dated Aug. 1, 2013 in U.S. Appl. No. 12/747,593.
Office Action dated May 7, 2020 in U.S. Appl. No. 16/359,123.
Final Office Action dated Sep. 17, 2020 in U.S. Appl. No. 16/359,123.
Advisory Action dated Dec. 30, 2020 in U.S. Appl. No. 16/359,123.
Office Action dated Apr. 19, 2021 in U.S. Appl. No. 16/359,123.
Notice of Allowance dated Aug. 4, 2021 in U.S. Appl. No. 16/359,123.

| C1 | C2 | C3 | C4 |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 20 | 1 | 0.5 | 0 |
| 21 | 1 | 0.5 | 1 |
| 22 | 1 | 0.5 | 2 |
| 23 | 1 | 1 | 0 |
| 24 | 1 | 1 | 1 |
| 25 | 1 | 2 | 0 |
| 26 | 1 | 3 | 0 |
| 27 | 1 | 4 | 0 |
| 28 | 1 | 5 | 0 |
| 29 | 1 | 6 | 0 |
| 30 | 2 | 0.5 | 0 |
| 31 | 2 | 0.5 | 1 |

FIG. 3

METHODS AND DEVICES FOR COMMUNICATING ON A RADIO CHANNEL BASED ON JOINTLY ENCODING A PREAMBLE FORMAT WITH RANDOM ACCESS CONFIGURATION

RELATED APPLICATIONS

This application is a continuation of U.S. patent application Ser. No. 16/359,123 which was filed Mar. 20, 2019, now U.S. Pat. No. 11,197,325, which is a continuation of U.S. patent application Ser. No. 15/728,637 which was filed Oct. 10, 2017, now U.S. Pat. No. 10,285,205, which is a continuation of U.S. patent application Ser. No. 13/766,111 which was filed Feb. 13, 2013, now U.S. Pat. No. 9,814,072, which is a continuation of U.S. patent application Ser. No. 14/747,593, which was filed Jun. 11, 2010, now U.S. Pat. No. 8,553,590, which is a national stage application of PCT/SE2008/050934, filed Aug. 20, 2008, and claims benefit of U.S. Provisional Application 61/013,051, filed Dec. 12, 2007, the disclosures of each of which are incorporated herein by reference in their entirety.

TECHNICAL FIELD

The present invention relates to methods and devices in a telecommunication system, in particular, for transmitting/receiving data on a radio channel.

BACKGROUND

In modern cellular radio systems, a radio network has a strict control on the behavior of a terminal. Uplink transmission parameters like frequency, timing, and power are regulated via downlink control signaling from a base station to the terminal.

At power-on or after a long standby time, a user equipment (UE) is not synchronized in the uplink. The UE can derive an uplink frequency and power estimate from the downlink (control) signals. However, a timing estimate is difficult to make since the round-trip propagation delay between a base station, eNodeB, and the UE is unknown. So, even if UE uplink timing is synchronized to the downlink, it may arrive too late at the eNodeB receiver because of propagation delays. Therefore, before commencing traffic, the UE has to carry out a Random Access (RA) procedure to the network. After the RA, the eNodeB can estimate the timing misalignment of the UE uplink and send a correction message. During the RA, uplink parameters like timing and power are not very accurate. This poses extra challenges to the dimensioning of a RA procedure.

Usually, a Physical Random Access Channel (PRACH) is provided for the UE to request access to the network. An access burst is used which contains a preamble with a specific sequence with good autocorrelation properties. The PRACH may be orthogonal to the traffic channels. For example, in GSM a special PRACH time slot is defined. Because multiple UEs may request access at the same time, collisions may occur between the requesting UEs. A contention resolution scheme has to be implemented to separate the UE transmissions. The RA scheme usually includes a random back off mechanism. The timing uncertainty is accounted for by extra guard time in the PRACH slot. The power uncertainty is usually less of a problem as the PRACH is orthogonal to the traffic channels.

To distinguish between the different requesting UEs performing RA typically many different RA preambles exist. A UE performing RA picks randomly a preamble out of a pool and transmits it. The preamble represents a random UE ID which is used by a eNodeB when granting the UE access to the network via the eNodeB. The eNodeB receiver can resolve RA attempts performed with different preambles and send a response message to each UE using the corresponding random UE IDs. In case that requesting UEs simultaneously use the same preamble a collision occurs and most likely the RA attempts are not successful since the eNodeB cannot distinguish between the two users with a different random UE ID.

In E-UTRAN, evolved UMTS Terrestrial Radio Access Network, 64 preambles are provided in each cell. Preambles assigned to adjacent cells are typically different to insure that a RA in one cell does not trigger any RA events in a neighboring cell. Information that must be broadcasted is therefore the set of preambles that can be used for RA in the current cell.

Since E-UTRAN is capable of operation under very different operation conditions, from femto- and pico-cells up to macro-cells, different requirements are put on RA. Whereas the achievable signal quality for RA is less of a problem in small cells and more challenging in large cells. To also ensure that enough RA preamble energy is received, E-UTRAN defines different preamble formats. Only one such preamble format may be used in a cell and also this parameter must therefore be broadcasted. For Frequency Division Duplex, FDD, four preamble formats are defined.

Yet another parameter that is broadcasted is the exact time-frequency location of a RA resource, also called slot or opportunity. Such a RA time resource spans always 1.08 MHz in frequency and either 1, 2, or 3 ms in time, depending on the preamble format. For FDD, 16 configurations exist, each defining a different RA time resource configuration.

In an FDD system in addition to the signaling required to point out the 64 preambles that can be used in the current cell another 6 bits are required to indicate preamble format (2 bits) and RA subframe configuration (4 bits).

Referring to, for example, E-UTRAN time division duplex, TDD, mode, TDD mode has some particularities relative to the FDD mode which make a simple reuse impossible or impractical including, e.g., that TDD defines in total 5 RA preamble formats and not 4 requiring 3 bits to signal the format. This additional preamble format will be called format 4 in the following. The increased number of preamble formats thereby requires an increased transmission capacity.

SUMMARY

It is an object of some embodiments to provide an efficient random access configuration signaling between two communication devices.

Embodiments disclose a method in a second communication device for transmitting data on a radio channel. The method comprises to jointly encode a preamble format with a first random access configuration, forming an extended random access configuration, and transmitting the extended random access configuration on the radio channel.

The extended random access configuration makes the signalling more efficient without the need of more transmission capacity.

Embodiments disclose a second communication device comprising a control unit arranged to jointly encode a preamble format with a first random access configuration. An extended random access configuration is thereby formed. The second communication device further comprises a transmitting arrangement adapted to transmit the extended random access configuration on a radio channel.

Embodiments disclose a method in a first device for performing a random access process comprising to receive data containing an extended random access configuration on a radio channel. The extended random access configuration is decoded and thereby a preamble format and a first random access configuration is retrieved. The preamble format and the first random access configuration is then used in order to perform a random access process.

Embodiments disclose a first communication device comprising a receiving arrangement adapted to receive data on a radio channel from a second communication device. The data comprises an extended random access configuration. The first communication device further comprises a control unit being arranged to decode the extended random access configuration to obtain a preamble format and a first radio access configuration, and arranged to use the preamble format and the random access configuration when performing a random access process.

By joint coding of RA configuration and preamble format only reasonable combinations are encoded, resulting in, for example, that signaling overhead is reduced.

BRIEF DESCRIPTION OF THE DRAWINGS

Embodiments will now be described in more detail in relation to the enclosed drawings, in which:

FIG. 3 shows a table of extended random access configurations.

DETAILED DESCRIPTION OF EMBODIMENTS

Figure 1:
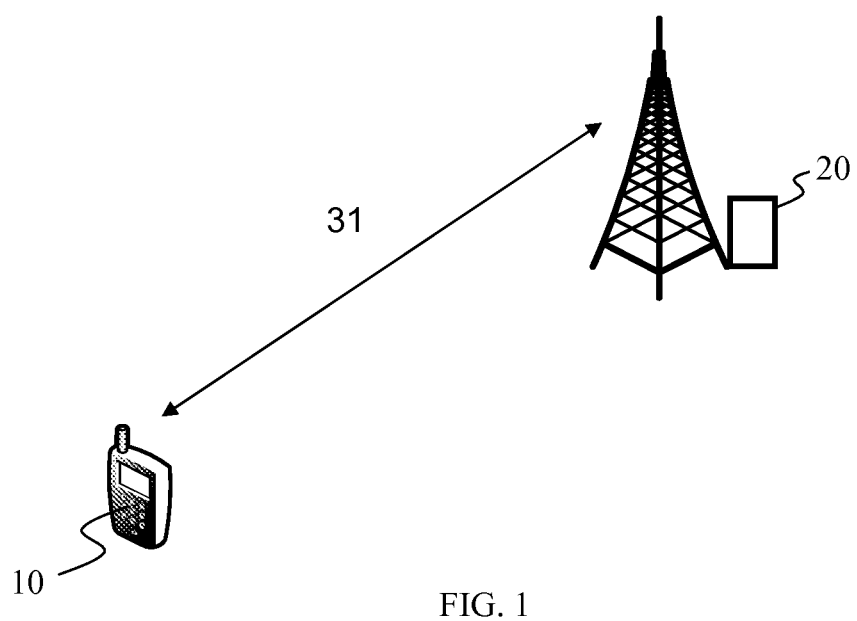
FIG. 1 shows a schematic overview of a first communication device communicating with a second communication device.

Embodiments of the present solution will be described more fully hereinafter with reference to the accompanying drawings, in which embodiments of the solution are shown. This solution may, however, be embodied in many different forms and should not be construed as limited to the embodiments set forth herein. Rather, these embodiments are provided so that this disclosure will be thorough and complete, and will fully convey the scope of the solution to those skilled in the art. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present solution is described below with reference to block diagrams and/or flowchart illustrations of methods, apparatus (systems) and/or computer program products according to embodiments of the invention. It is understood that several blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein a communication device may be a wireless communications device. In the context of the invention, the wireless communication device may e.g. be a node in a network such as a base station or the like, a mobile phone, a PDA (Personal Digital Assistant) or any other type of portable computer such as laptop computer.

The wireless network between the communication devices may be any network such as an IEEE 802.11 type WLAN, a WiMAX, a HiperLAN, a Bluetooth LAN, or a cellular mobile communications network such as a GPRS network, a third generation WCDMA network, or E-UTRAN. Given the rapid development in communications, there will of course also be future type wireless communications networks with which the present invention may be embodied, but the actual design and function of the network is not of primary concern for the solution.

In FIG. 1 a schematic overview of a first communication device 10 communicating with a second communication device 20 is shown. The communication is performed over a first interface 31 such as an air interface or the like. In the illustrated example, the first communication device 10 is a portable unit, such as a mobile phone, a PDA or the like and the second communication device 20 is a base station, such as an eNobeB, NodeB, RBS or the like.

The second communication device sets up and transmits random access, RA, configurations in order for the first communication device to perform a random access process. The RA related data comprising preamble format, RA configurations, such as, cyclic shift length, subframes to use for random access and the like.

The present invention proposes a joint encoding between preamble formats and RA configurations. Since not all RA configurations are applicable to all RA preambles, for example, the RA preamble format requiring a RA resource duration of 3 ms cannot be scheduled every $2^{nd}$ subframe, i.e. every 2 ms, the joint encoding will improve the signaling.

By joint coding of RA configuration and preamble format the number of reasonable combinations may be reduced enabling reuse of FDD signaling.

In the FDD mode of E-UTRAN, 6 different "densities" of RA opportunities are defined to accommodate the different expected loads on PRACH: 0.5, 1, 2, 3, 5, and 10 RA opportunities within 10 ms independent of the system bandwidth. As a starting point it makes therefore sense to assume these densities for TDD as well. In total there are 5 preamble formats for TDD and for each preamble format up to 6 densities resulting in 30 different combinations. In addition it is desirable to have different "versions" of each combination. For example, in the case with 1 RA opportunity per 10 ms and preamble format 0 (basic preamble) it is desirable to have 3 different patterns with the same density but where the RA opportunities are allocated at different sub-frames. This enables an eNodeB that serves multiple cells to use different RA pattern across served cells thus spreading processing load in time.

Thus, three versions multiplied with five preambles multiplied with six densities results in total in ninety combinations that need to be encoded. However, this exceeds the available number of six bits. Looking more detailed into the different combinations shows that not all combinations actually make sense: Preamble formats 1 and 3 are designed for very large cells where RA load is typically not so high. It is probably for these formats not very important to support the highest densities. Preamble format 3 furthermore requires three subframes which makes it for most common DL/UL splits impossible to support three different versions not overlapping in time. The number of densities and versions could thus be reduced to 3×4=12 for format 1 and 2×2=4 for format 3.

A reasonable set of supported densities for format 1 could be 0.5, 1, 2, and 3 RA opportunities within 10 ms. For format 3 only densities 0.5 and 1 RA opportunities within 10 ms are supported. This results for format 0 to 3 in total 3×6+3×4+3×6+2×2=52 combinations to encode.

With six bits, sixty four combinations may be encoded leaving twelve combinations for format 4. This format 4 is special since it is very short and may only occur in a special field called Uplink Pilot Timeslot, UpPTS. Because of its short duration the link budget of this preamble is inferior compared to other preambles, therefore it is important to have different non-overlapping RA opportunities to create "interference-free" slots. It is important to support three different versions leaving space for four densities for preamble format 4. In total 52+3×4=64 combinations exist. Table 1 summarizes these allocations for the different preambles. The proposed configurations are only examples, it is of course possible to have more combinations for one preamble format and less for another one or trade number of versions vs. number of densities.

TABLE 1

Example of version and density

| Preamble format | RA resources per 10 ms | #Versions |
|---|---|---|
| 0 | 0.5, 1, 2, 3, 5, 10 | 3 |
| 1 | 0.5, 1, 2, 3 | 3 |
| 2 | 0.5, 1, 2, 3, 5, 10 | 3 |
| 3 | 0.5, 1 | 2 |
| 4 | www, xxx, yyy, zzz | 3 |

Another possibility is to generally support at the most five densities and not six when assuming that the $6^{th}$ density (10 RA opportunities in 10 ms) is very high. Using the same arguments as above, the densities and number of versions shown in table 2 are obtained for the different preamble formats. Here is one combination reserved for future use. Also this set of combinations is only an example and different tradeoffs between preamble formats and densities vs. versions can also be made here.

TABLE 2

Another example of version and density allocation for different preamble formats:

| Preamble format | RA resources per 10 ms | #Versions |
|---|---|---|
| 0 | 0.5, 1, 2, 3, 5 | 3 |
| 1 | 0.5, 1, 2, 3 | 3 |

TABLE 2-continued

Another example of version and density allocation for different preamble formats:

| Preamble format | RA resources per 10 ms | #Versions |
|---|---|---|
| 2 | 0.5, 1, 2, 3, 5 | 3 |
| 3 | 0.5, 1 | 3 |
| 4 | 5 different densities | 3 |

In the following a combination of preamble format, density, and version is referred to as extended RA configuration.

Even though above explanations were done in the context of a TDD system the same ideas are also applicable to a half-duplex FDD system.

Figure 2:
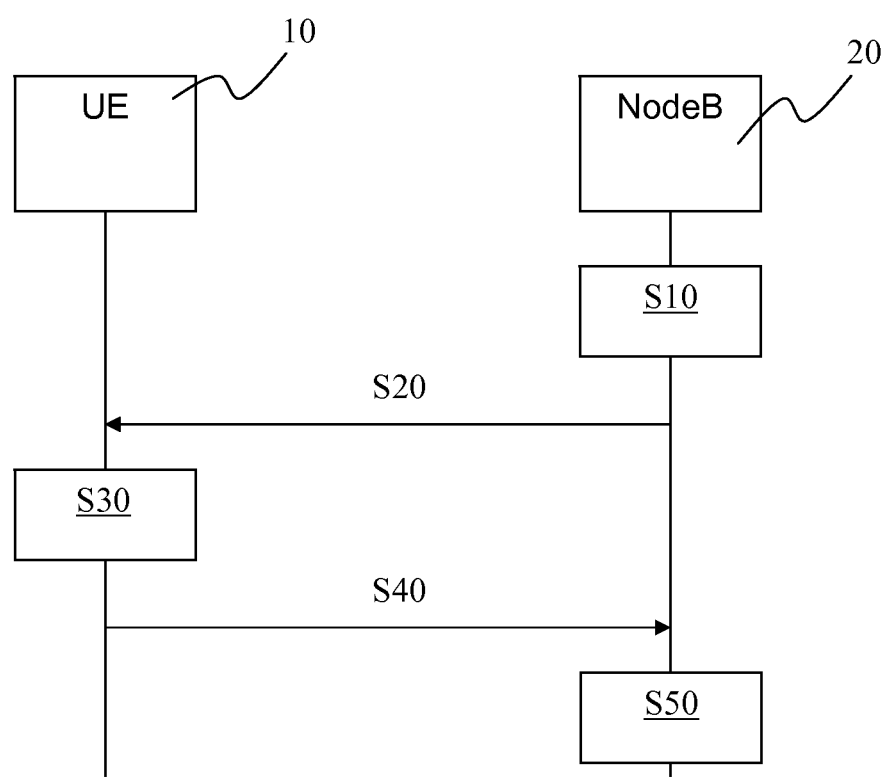
FIG. 2 shows a combined signaling and method diagram of a random access procedure.

In FIG. 2, an example of a schematic combined signaling and method diagram between a first communication device 10 and a second communication device 20 is shown. The first communication device 10 may be a user equipment UE, such as a mobile phone, a PDA, or the like. The second communication device 20 may be a base station, such as a RBS, NodeB, eNodeB, a combined RBS and RNC, or the like.

In step S10, the second communication device 20 jointly encodes a preamble format with a first random access configuration, forming an extended random access configuration.

In step S20, the second communication device 20 transmits the extended random access configuration on a radio channel, such as a broadcast channel or the like.

In step S30, the first communication device 10 receives the extended random access configuration on the broadcast channel and processes the extended random access configuration by, for example, looking up the extended random access configuration value in a stored table of extended random access configurations. Thereby, the first communication device 10 determines what preamble format and random access configuration to use when performing a random access process.

In step S40, the first communication device 10 transmits a random access request to gain access to a network on, for example, a physical random access channel PRACH using the preamble format and the random access configuration to the second communication device 20.

In step S50, the second communication device 20 process the random access request in order to allow or decline access to a network. The second communication device 20 may as well confirm reception of the random access request.

It should be noted that the UE may transmit the access request to a different communication device, base station; this might be the case during, for example, handover. In this case, wherein the first communication device 10 performs a random access procedure with a different communication device, the different communication device processes the random access request.

In FIG. 3, a schematic overview of a table listing extended random access configurations and the corresponding preamble format, PRACH density value and version index is provided.

In a first column C1 PRACH configuration index is indicated. Each PRACH configuration index, that is, the extended random access configuration, corresponds to a certain combination of a preamble format, a PRACH density value and a version index. The preamble format is listed in a second column C2, density per 10 ms in a third column C3, and the version in a fourth column C4.

Figure 4:
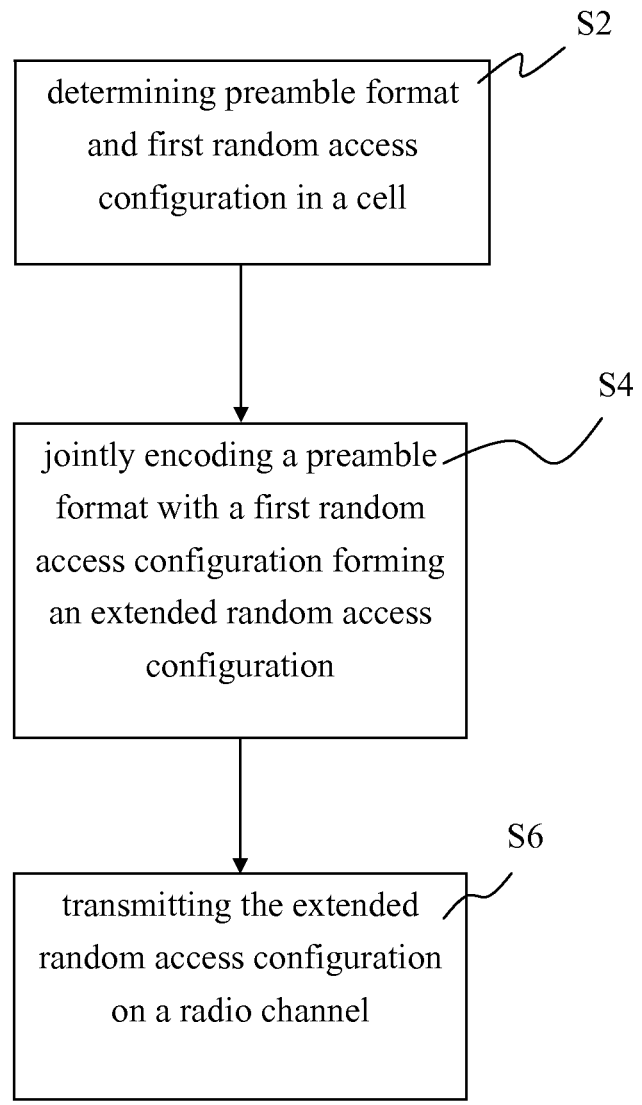
FIG. 4 shows a flow chart of a method in a second communication device.

In FIG. 4, a schematic flow chart of a method in a second communication device is shown.

In optional step S2, the second communication device determines a first random access configuration and a preamble format to use in a cell of the second communication device. The determination may be based on the size of the cell and the like. These random access settings may also be manually inputted during installation or setup.

In step S4, the second communication device jointly encodes the determined preamble format with the first random access configuration, forming an extended random access configuration. The extended random access configuration may in some embodiments correspond to a combination of a preamble format, a density value of a Physical Random Access Channel and a version index defined in a table.

Within one radio frame we have multiple RA opportunities according to the RA density. Each RA opportunity consists of a number of subframes, for example, 1, 2, or 3 subframes, depending on the preamble format.

A version may be defined by a collection of random access opportunities belonging to the cell of the second communication device.

The extended random access configuration may in some embodiments require maximum six bits.

The preamble format may be one out of five preamble formats.

In step S6, the second communication device transmits the extended random access configuration on a radio channel in the cell of the second communication device.

The radio channel may in some embodiments be a broadcast channel.

In order to perform the method steps a second communication device is provided. The second communication device 20 may be a base station, such as a RBS, NodeB, eNodeB, a combined RBS and RNC, or the like.

Figure 5:
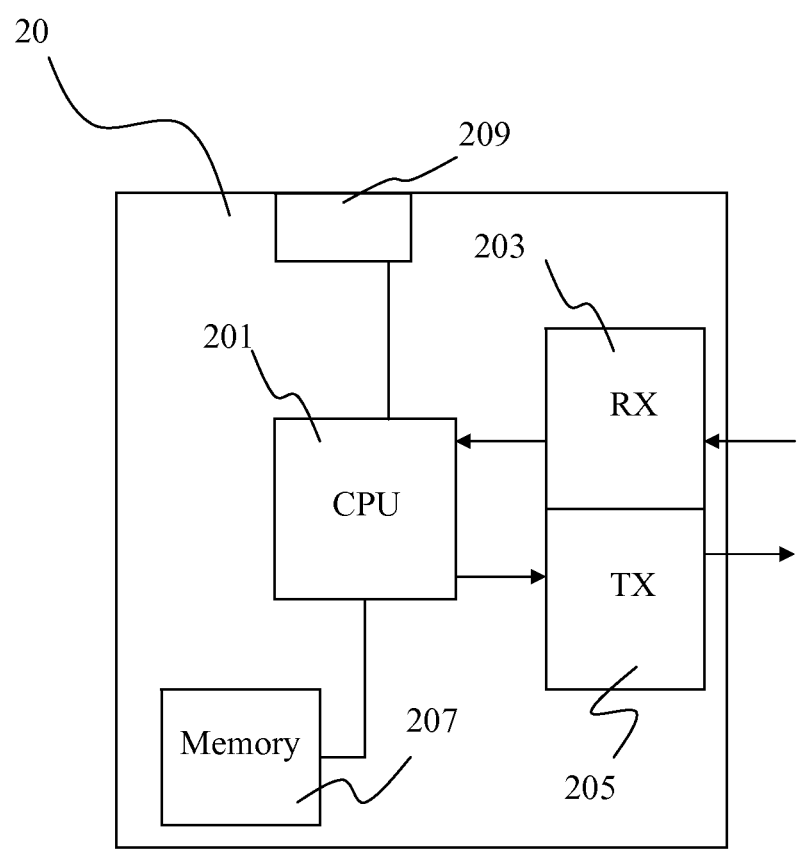
FIG. 5 shows a schematic overview of a second communication device.

In FIG. 5 a schematic overview of a second communication device 20 is shown.

The second communication device 20 comprises a control unit CPU 201, such as a μprocessor, a plurality of processors or the like, configured to jointly encode a preamble format with a first random access configuration, thereby forming an extended random access configuration. The first random access configuration may correspond to a combination of a density value of a Physical Random Access Channel and a version index. The control unit 201 may further create a data packet comprising the extended random access configuration, for example, a value of six bits.

In addition, the control unit 201 may, in some embodiments, be arranged to determine cell related parameters, such as, the first random access configurations, the preamble format and/or the like. The determination may be performed in real time based on load, size of a cell and/or the like. The values of preamble format, random access configurations and the like may also be inputted manually.

The second communication device 20 further comprises a transmitting arrangement 205 adapted to transmit the data packet comprising the extended random access configuration. The data packet is transmitted over a radio channel of the cell of the second communication device 20. The radio channel may be, for example, a broadcast channel.

The second communication device 20 may further comprise a receiving arrangement 203 adapted to receive data from different communication devices, for example, a first communication device using the preamble format and the first random access configuration on, for example, a physical random access channel.

In the illustrated example, the second communication device 20 comprises a memory unit 207 arranged to have application installed thereon that when executed on the control unit makes the control unit perform the method steps. Furthermore, the memory unit 207 may have data stored, such as random access related data or the like, thereon. The data may comprise a table listing extended random access configurations and the corresponding preamble format, PRACH density value and version index that may be used when creating the data packet. The memory unit 207 may be a single unit or a number of memory units.

Furthermore, the second communication device 20 may comprise an interface 209 for communicating with, for example, a network to which a first communication device requests access.

Figure 6:
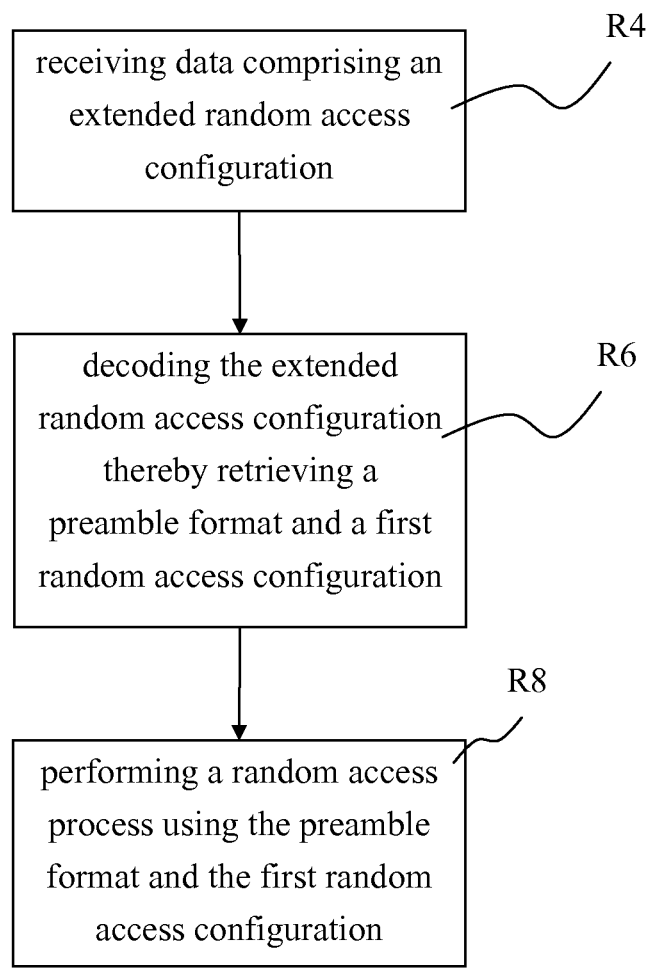
FIG. 6 shows a flow chart of a method in a first communication device.

In FIG. 6 a schematic flow chart of a method in a first communication device is shown.

In step R4, the first communication device receives data containing an extended random access configuration over a radio channel. The radio channel may be a broadcast channel or the like.

In step R6, the first communication device decodes the received data, reading the extended random access configuration as, for example, a value of maximum six bits. The extended random access configuration value may from a table generate a preamble format and a random access configuration. In some embodiments, the random access configuration comprises a combination of a density of a PRACH and a version index. As stated above, a version may be defined by a collection of random access opportunities belonging to a cell of the second communication device.

In optional step R8, the first communication device performs a random access process using the preamble format and the first random access configuration.

The random access process may be performed to the second communication device, base station, or a different communication device, such as a different base station. This may be the case when a handover is performed.

In order to perform the random access procedure a first communication device is provided. The first communication device may be a user equipment, such as, a mobile phone, a PDA or the like.

Figure 7:
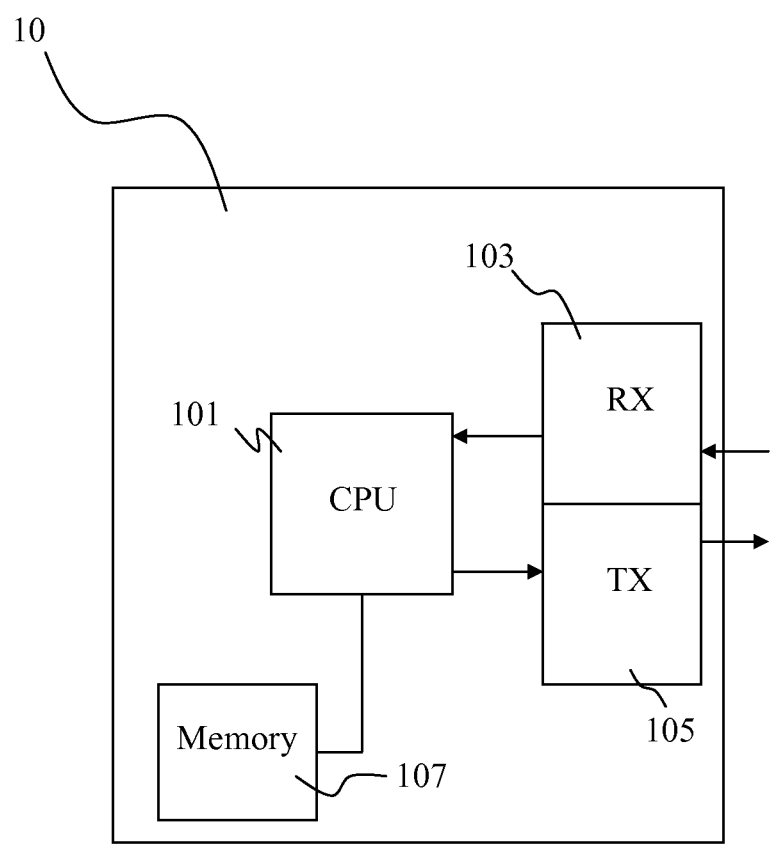
FIG. 7 shows a schematic overview of a first communication device.

In FIG. 7, a schematic overview of a first communication device 10 is shown.

The first communication device 10 comprises a receiving arrangement 103 adapted to receive data over a radio channel, such as a broadcast channel or the like, from a second communication device. The data comprises an extended random access configuration.

The first communication device 10 further comprises a control unit 101 arranged to decode the extended random access configuration to obtain a preamble format and a first radio access configuration. The extended random access configuration may be a value of maximum six bits and by comparing the extended random access configuration value with index values in a table a preamble format, a density value of a PRACH and a version index may be retrieved, upon matching of values.

The control unit 101 may additionally be arranged to perform a random access process in order to access a network. In the random access process, the control unit 101 uses the preamble format and the random access configuration and transmits the connection request using a transmitting arrangement 105.

The first communication device 10 may further contain a memory arrangement 107, comprising a single memory unit or a number of memory units. Applications arranged to be executed on the control unit may be stored on the memory that when executed on the control unit makes the control unit perform the method steps. Furthermore, the memory unit 207 may have data stored thereon, such as RA configurations data, such as, preamble format, random access configurations and the like. The data may comprise a table listing extended random access configurations and the corresponding preamble format, PRACH density value and version index that may be used when creating the data packet. The memory unit 207 may be a single unit or a number of memory units.

It should be noted that a version may be defined by a collection of random access opportunities belonging to the cell of the second communication device.

The extended random access configuration may in some embodiments require maximum six bits.

The preamble format may be one of five preamble formats.

It should be understood that the receiving and transmitting arrangements in the communication devices may be separated devices or arranged as a combined device, such as a transceiving unit or the like.

Depending on the DL/UL allocation the different RA configurations have different interpretations. In order to reduce the required signaling it is therefore proposed to number the subframes allocated to RA in terms of UL subframes rather than subframes.

One possibility may be to define for each extended RA configuration and each possible DL/UL allocation a pattern describing the UL subframes and frequency region allocated to RA. In addition to DL/UL split the system bandwidth also has an impact since for lower system bandwidth less frequency regions are available than for higher bandwidth.

Figure 8:
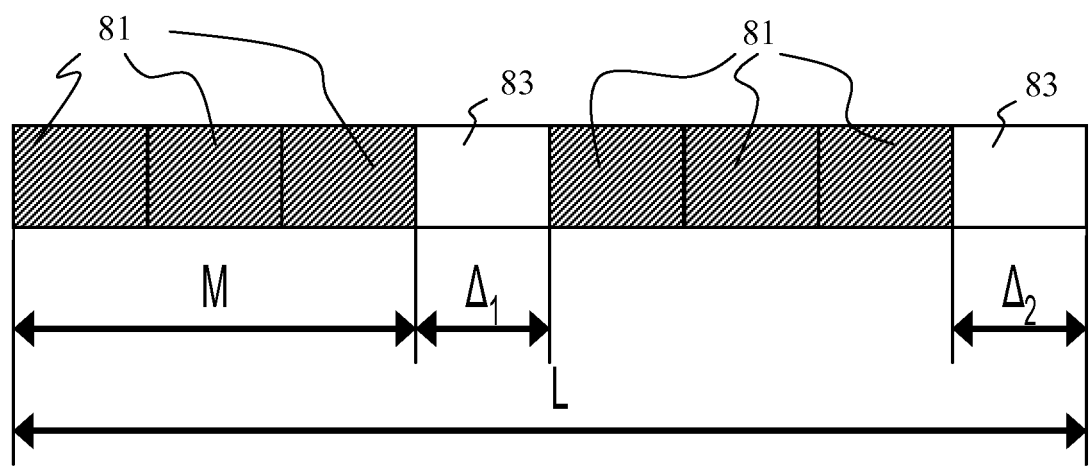
FIG. 8 shows a schematic overview of UL subframes within the duration of one RA period.

A more systematic approach is described in the following: In FIG. 8 all UL subframes within the duration of one RA period are shown. RA subframes are denoted 81 and non RA subframes are denoted as 83. The RA period is 10 ms for RA densities larger or equal to 1 per 10 ms and 20 ms for 0.5 RA opportunities per 10 ms. The number of UL subframes within the RA period is denoted L. The number of subframes allocated to each RA resource is M. N is then the number of RA resources that can be placed non-overlapping in each RA period. The considered extended RA configuration has a density of D RA opportunities within the RA period. The gaps Δ1 and Δ2 are the numbers of UL subframes between two consecutive RA resources and the number of RA subframes left after the last RA subframe, respectively. R denotes the number of different versions that exist of the given extended RA configuration.

$$N = \min\left(\left\lfloor \frac{L}{M} \right\rfloor, R \cdot D\right)$$

$$\Delta_1 = \left\lfloor \frac{L - N \cdot M}{N} \right\rfloor$$

$$\Delta_2 = L - N \cdot M - (N-1) \cdot \Delta_1$$

The number $t_{l,k}$ to be the UL subframe number where RA opportunity k of version l of the given extended RA configuration starts. Here is assumed that the numbering of UL subframes and versions start with 0. If not enough versions may be placed non-overlapping into one RA period the placement starts over starting from UL subframe 0 at another frequency. Further, the number $f_{l,k}$ denotes the logical index to the predefined frequency at which RA opportunity k of version l is located at (logical index since the predefined frequencies neither have to be contiguous nor assigned to monotonic increasing/decreasing frequencies). Since in total only $N_{RA/BW}$ predefined RA frequency regions exist a modulo operations is required to constrain the allocated frequency band to those predefined frequencies. For smaller system bandwidth not enough RA frequency bands $N_{RA/BW}$ may exist and placement of different RA resources overlap.

$$t_{k,l} = (k \cdot D + l \bmod N) \cdot (M + \Delta_1)$$

$$f_{k,l} = \left\lfloor \frac{k \cdot D + l}{N} \right\rfloor \bmod N_{RA/BW}$$

Figure 9:
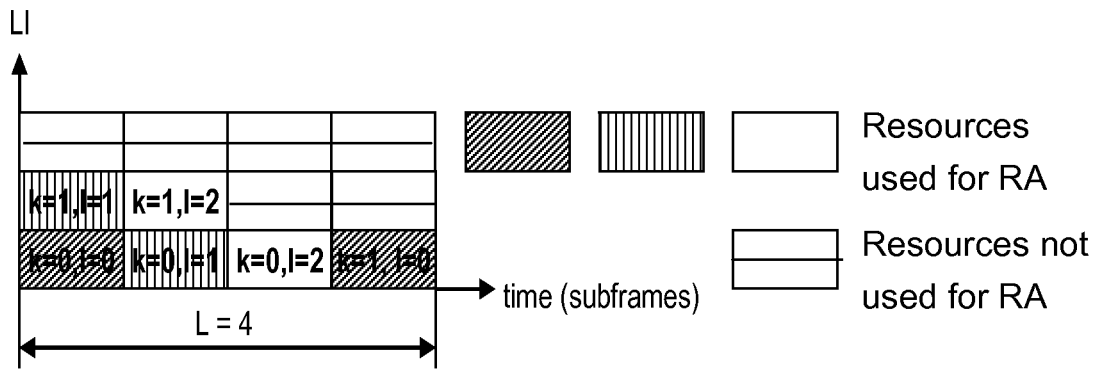
FIG. 9 shows a schematic overview of examples how RA opportunities are mapped to uplink subframes.
Figure 9:
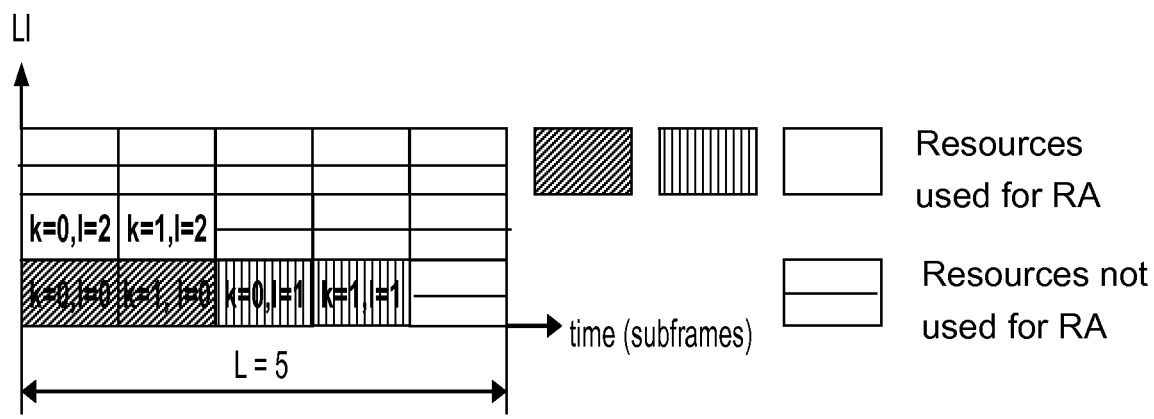
Figure 9:
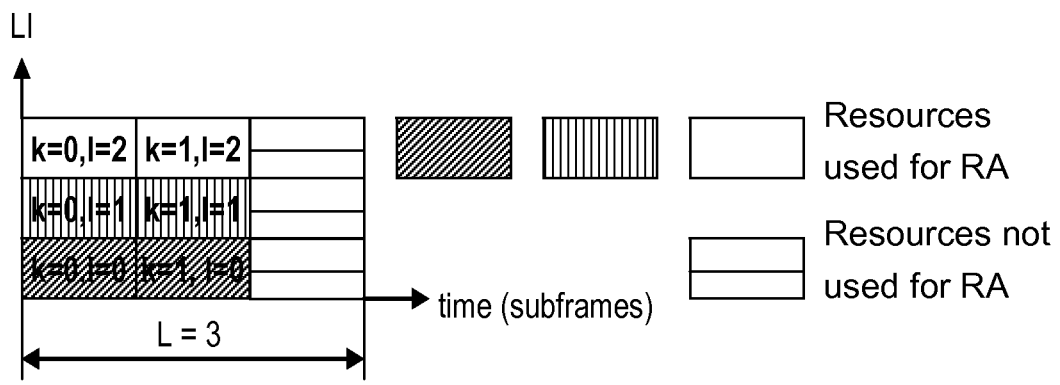

FIG. 9 shows different examples of extended RA configurations and their actual mapping to UL subframes.

In the top figure the RA opportunity 0 of version 0 is firstly allocated followed by opportunity 0 of versions 1 and 2, that is, l=1 and 2. RA opportunity 1 of version 0 is then allocated along the time domain and RA opportunity 1 of versions 1 and 2 are allocated in a different frequency.

In the middle figure, the RA opportunity 0, version 0 is followed by RA opportunity 0 of versions 1. RA opportunity 0 of version 2 is then frequency multiplexed into the same UL subframes as RA opportunity 0 of version 0. Here one RA opportunity consists of 2 UL subframes.

In the lower figure, each version is allocated at different frequencies.

The simplest way to define the predefined RA frequency regions is to extend the concept from FDD where these regions are placed at the band edges of the uplink shared channel. If multiple RA resources are distributed over time within a RA period (i.e. N>1) the position of these frequency regions may hop according to a predefined hopping pattern. In the simplest case the only allowed hopping positions are at the two band edges of the uplink shared channel.

Figure 10:
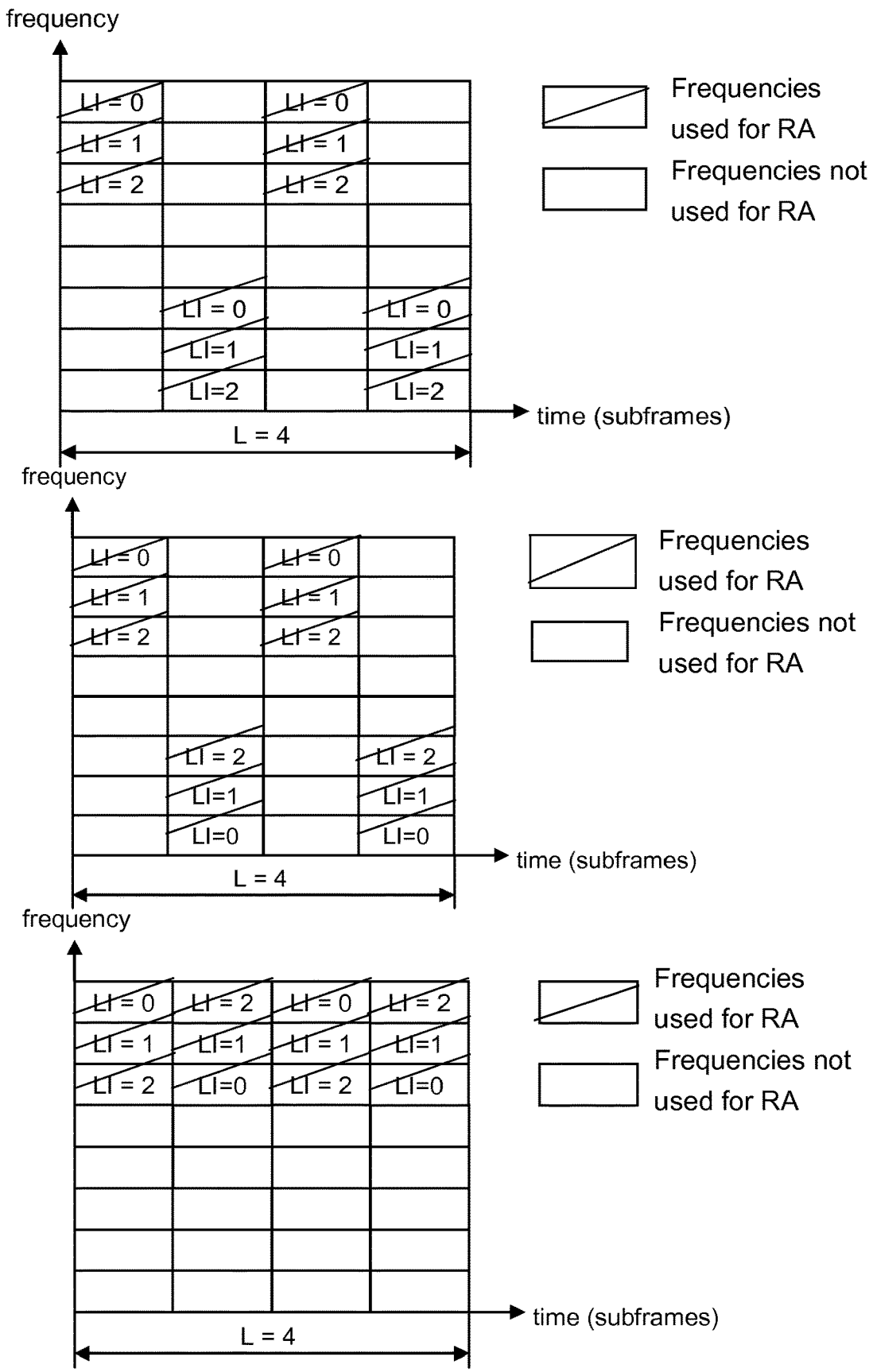
FIG. 10 shows a schematic overview of mapped resources when using frequency hopping.

FIG. 10 depicts examples how such a frequency hopping could look like. In FIG. 10, it is shown how logical index -LI-, also denoted as $f_{l,k}$ in the formula above, is mapped to physical frequencies.

The described way is an example how to calculate the exact mapping of UL subframes to RA subframes. Important is 1) to try to spread out opportunities in time and 2) (if not enough UL subframes are available to separate all opportunities of a version in time) to place multiple RA subframes into the same UL subframe(s) at different frequencies.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a base station of an evolved UMTS Terrestrial Radio Access Network, E-UTRAN, operating in time divisional duplex, TDD, mode for transmitting data on a radio channel, the method comprising:
jointly encoding a preamble format with a first random access configuration, forming an extended random access configuration represented by a set of bits, wherein said joint encoding comprises setting a value of each individual bit in the set based on both the preamble format and the first random access configuration, wherein the first random access configuration comprises a combination of:
a density value defining a density of random access opportunities on a Physical Random Access Channel, PRACH; and
a version index defining one of several possible patterns of opportunities on the PRACH for that density, each pattern allocating opportunities to different sub-frames of the PRACH, each preamble format associated with a plurality of version indexes; and
transmitting the extended random access configuration on the radio channel.

2. The method of claim 1, further comprising determining the first random access configuration and the preamble format to use in a cell of the base station.

3. The method of claim 2, wherein said determining comprises selecting the first random access configuration and the preamble format from a subset of nominally possible combinations of a first random access configuration and a preamble format, wherein the subset includes a number of possible combinations less than the number of nominally possible combinations.

4. The method of claim 3, wherein the subset excludes at least one of:
a nominally possible combination of a preamble format having a first value and a first random access configuration that comprises a density value higher than a defined threshold; and
a nominally possible combination of a preamble format having a second value and a first random access configuration that comprises a density value higher than the defined threshold and a version index having a third value.

5. The method of claim 1, wherein the extended random access configuration comprises a maximum of six bits.

6. The method of claim 1, wherein the radio channel comprises a broadcast channel.

7. A base station of an evolved UMTS Terrestrial Radio Access Network, EUTRAN, configured to operate in time divisional duplex, TDD, mode, the base station comprising:
a control circuit configured to jointly encode a preamble format with a first random access configuration, thereby forming an extended random access configuration represented by a set of bits, wherein said joint encoding comprises setting a value of each individual bit in the set based on both the preamble format and the first random access configuration, wherein the first random access configuration comprises a combination of:
a density value defining a density of random access opportunities on a Physical Random Access Channel, PRACH; and
a version index defining one of several possible patterns of opportunities on the PRACH for that density, each pattern allocating opportunities to different sub-frames of the PRACH, each preamble format associated with a plurality of version indexes; and
a transmitting circuit configured to transmit the extended random access configuration on a radio channel.

8. The base station of claim 7, wherein the control circuit is further configured to determine the first random access configuration and the preamble format to use in a cell of the base station.

9. The base station of claim 8, wherein the control circuit is configured to select the first random access configuration and the preamble format from a subset of nominally possible combinations of a first random access configuration and a preamble format, wherein the subset includes a number of possible combinations less than the number of nominally possible combinations.

10. The base station of claim 9, wherein the subset excludes at least one of:
a nominally possible combination of a preamble format having a first value and a first random access configuration that comprises a density value higher than a defined threshold; and
a nominally possible combination of a preamble format having a second value and a first random access configuration that comprises a density value higher than the defined threshold and a version index having a third value.

11. The base station of claim 7, further comprising a receiving circuit configured to receive random access data from a user equipment, and wherein the control circuit is configured to process the random access data.

12. The base station of claim 7, wherein the extended random access configuration comprises a maximum of six bits.

13. The base station of claim 7, wherein the radio channel comprises a broadcast channel.

14. A method in a user equipment of an evolved UMTS Terrestrial Radio Access Network, E-UTRAN, operating in time divisional duplex, TDD, mode for performing a random access process, the method comprising:
receiving on a radio channel a set of bits that represents an extended random access configuration formed from a preamble format and a first random access configuration, wherein the first random access configuration comprises a combination of:
a density value defining a density of random access opportunities on a Physical Random Access Channel, PRACH; and
a version index defining one of several possible patterns of opportunities on the PRACH for that density, each pattern allocating opportunities to different sub-frames of the PRACH, each preamble format associated with a plurality of version indexes;
jointly decoding the preamble format and the first random access configuration from the set of bits, by determining a value for the preamble format based on the values of all bits in the set and determining a value for the first random access configuration also based on the values of all bits in the set, and performing a random access process using the preamble format and the first random access configuration.

15. The method of claim 14, wherein the extended random access configuration comprises a maximum of six bits.

16. The method of claim 14, wherein receiving said set of bits comprises receiving said set of bits on a broadcast channel.

17. A User Equipment of an evolved UMTS Terrestrial Radio Access Network, E-UTRAN, configured to operate in time divisional duplex, TDD, mode, the User Equipment comprising:
a receiving circuit configured to receive on a radio channel a set of bits that represents an extended random access configuration formed from a preamble format and a first random access configuration, the first random access configuration comprising a combination of:
a density value defining a density of random access opportunities on a Physical Random Access Channel, PRACH; and
a version index defining one of several possible patterns of opportunities on the PRACH for that density, each pattern allocating opportunities to different sub-frames of the PRACH each preamble format associated with a plurality of version indexes; and
a control circuit configured to:
jointly decode the preamble format and the first random access configuration from the set of bits, by determining a value for the preamble format based on the values of all bits in the set and determining a value for the first random access configuration also based on the values of all bits in the set, and
perform a random access process using the preamble format and the random access configuration.

18. The User Equipment of claim 17, wherein the extended random access configuration comprises a maximum of six bits.

19. The User Equipment of claim 17, further comprising a transmitting circuit configured to transmit a random access request using the preamble format and the random access configuration.

20. The User Equipment of claim 17, wherein the receiving circuit is configured to receive the set of bits on a radio channel that comprises a broadcast channel.

* * * * *